US006791988B1

(12) United States Patent
Hameleers et al.

(10) Patent No.: US 6,791,988 B1
(45) Date of Patent: Sep. 14, 2004

(54) PROCESSING OF CALLS TERMINATING IN A PACKET SWITCHED PROTOCOL BASED CELLULAR COMMUNICATION NETWORK

(75) Inventors: Heino Hameleers, Kerkrade (NL); Frank Hundscheidt, Kerkrade (NL); Eric Valentine, Plano, TX (US); Helena Odling, Stockholm (SE); Stephen Terill, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/560,242

(22) Filed: Apr. 27, 2000

(30) Foreign Application Priority Data

Apr. 29, 1999 (EP) .............................................. 99108369

(51) Int. Cl.[7] .............................................. H04L 12/28
(52) U.S. Cl. ....................... 370/401; 370/329; 370/466
(58) Field of Search ................................. 370/352–356, 370/400, 401, 466, 467, 329, 252

(56) References Cited

U.S. PATENT DOCUMENTS

| 5,475,689 | A | | 12/1995 | Kay et al. .................... 370/337 |
| 6,026,087 | A | * | 2/2000 | Mirashrafi et al. .......... 370/389 |
| 6,069,890 | A | * | 5/2000 | White et al. ................. 370/352 |

FOREIGN PATENT DOCUMENTS

| EP | 0 910 198 A2 | 4/1999 |
| WO | WO 98/36612 | 8/1998 |

OTHER PUBLICATIONS

Barel, C., European Search Report, Oct. 4, 1999, App. No. EP 99108369, pp. 1–3.
International Search Report prepared by the European Patent Office; completed on Aug. 11, 2000 by C. Barel as pertaining to PCT/EP00/03059.
N. Greene et al. "Media Gateway Control Protocol Architecture and Requirements", Network Working Group Request for Comments: 2805, Apr. 2000, 1–43.
M. Pantaleo "The Megaco/H 248 Gateway Control Protocol, version 2", Feb. 2002, 1–178.
M. Brahmanapally et al. "Megaco/H.248 Call Flow Examples", Media Gateway Control (Megaco) Internet Engineering Task Force, Mar. 2002, 1–257.

* cited by examiner

*Primary Examiner*—John Pezzlo

(57) ABSTRACT

The present invention relates to a method for processing a call within a communication network having a packet switched protocol based cellular telephone network comprising a first layer for transferring signalling information assigned to a telephone call being processed by the communication network, a second layer for transferring payload information assigned to the telephone call and interface means for coupling the cellular telephone network to a further network the interface means comprising payload information exchange function between the cellular telephone network and the further network, wherein the second layer of the cellular telephone network transfers the payload information of the telephone call to and from the interface means on a direct route assigned to the telephone call within the second layer

51 Claims, 4 Drawing Sheets

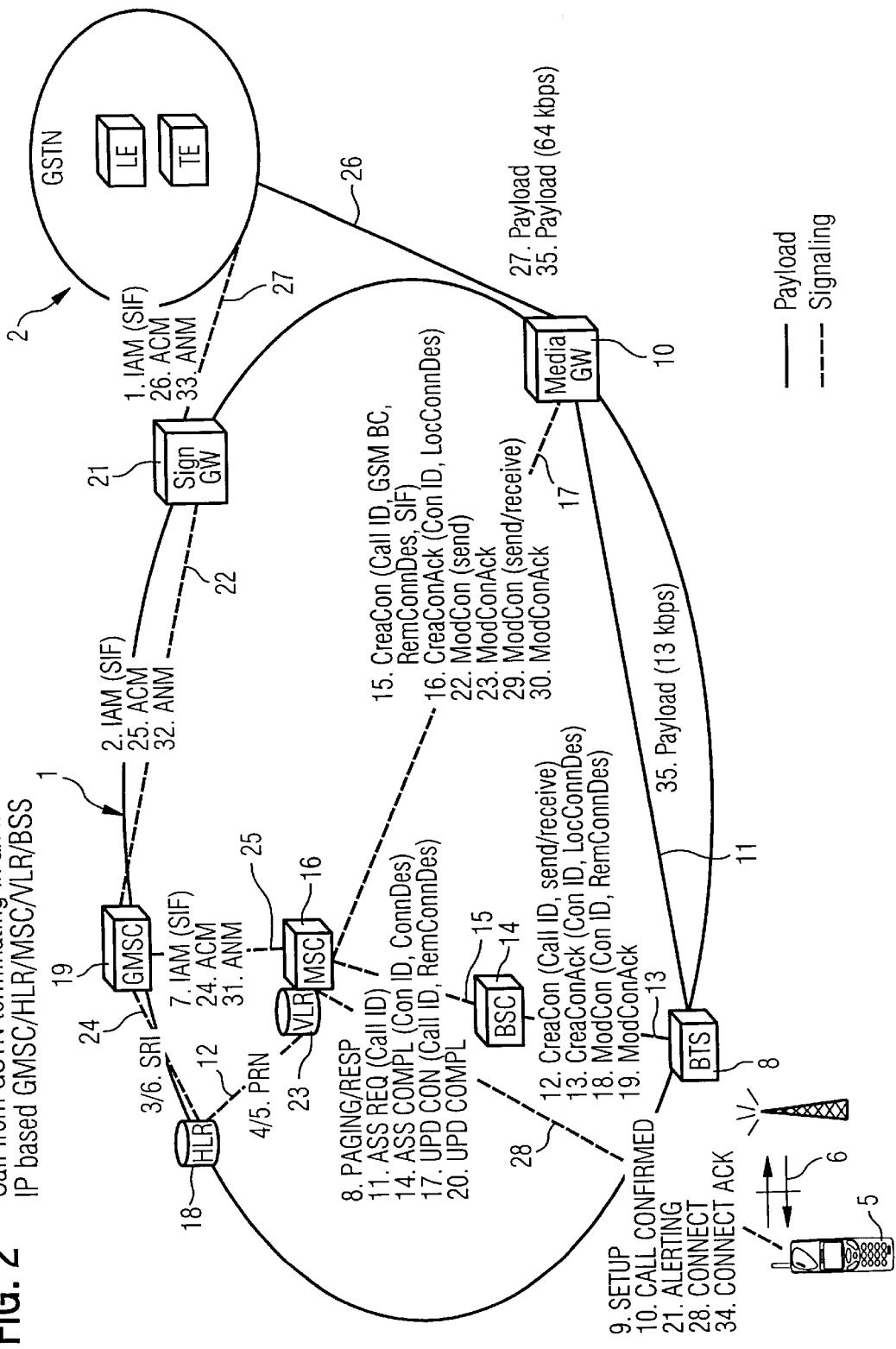

Figure 1:
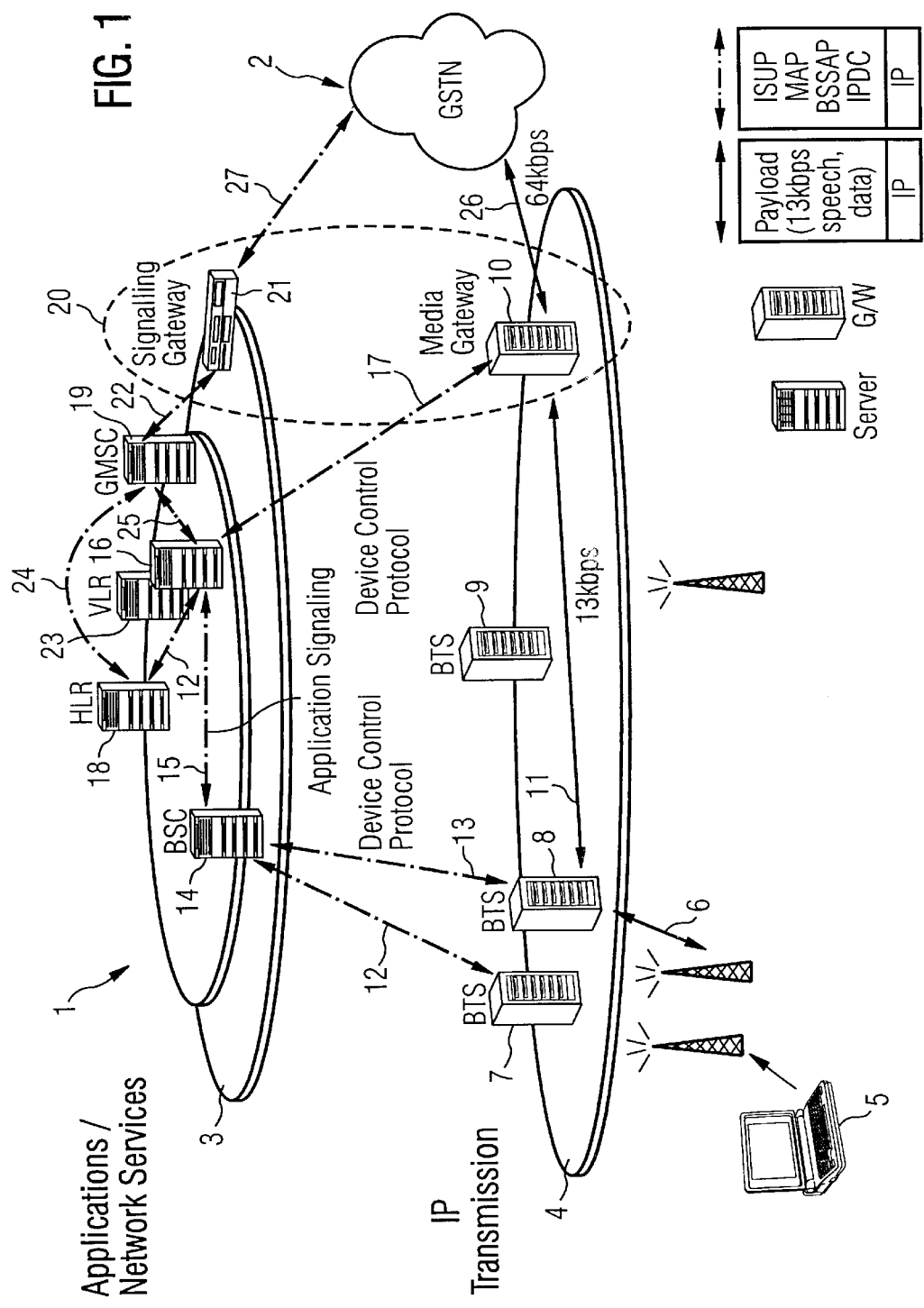

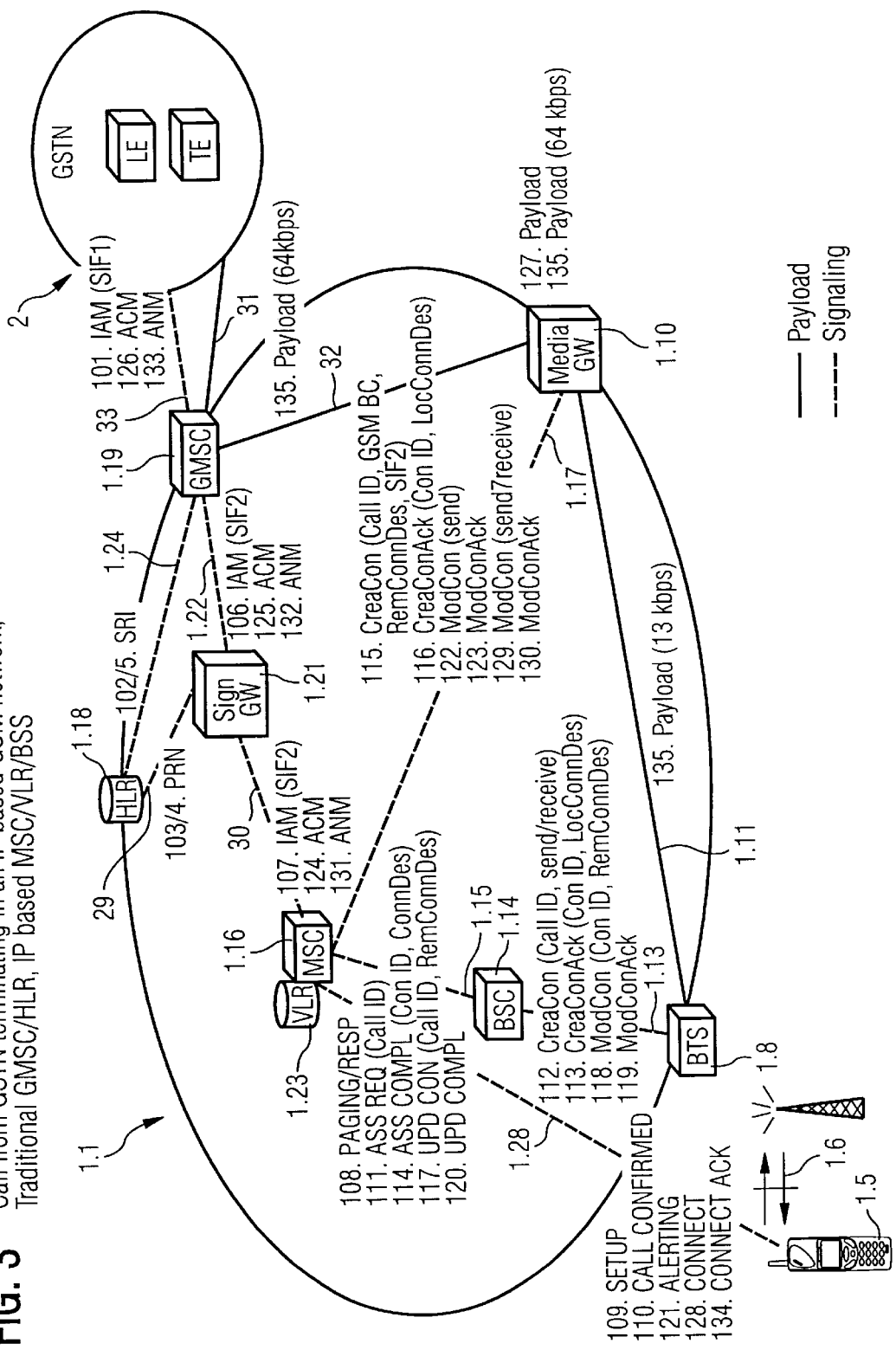
FIG. 3  Call from GSTN terminating in an IP based GSM network, Traditional GMSC/HLR, IP based MSC/VLR/BSS

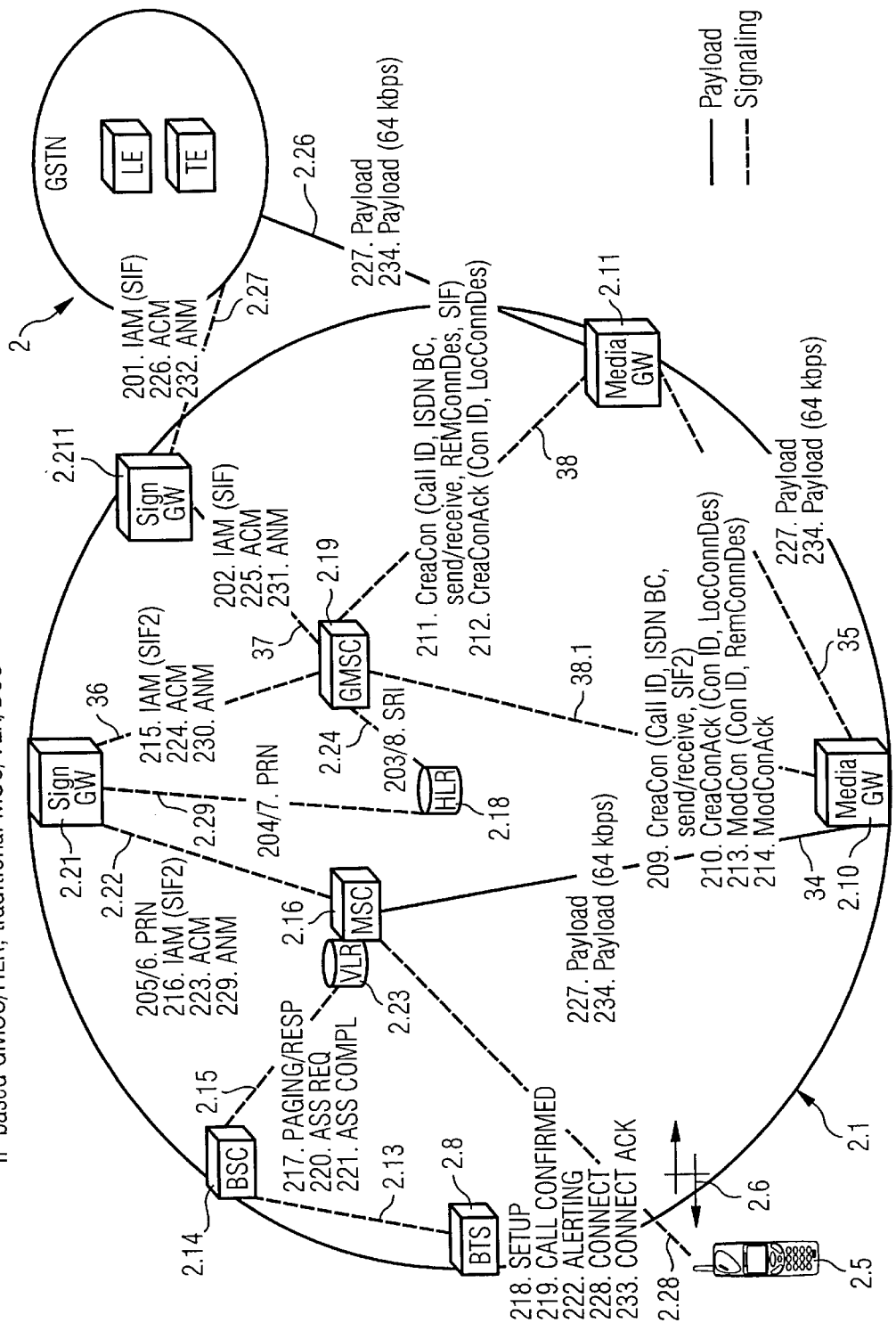
FIG. 4   Call from GSTN terminating in an IP based GSM network, IP based GMSC/HLR, traditional MSC/VLR/BSS

PROCESSING OF CALLS TERMINATING IN A PACKET SWITCHED PROTOCOL BASED CELLULAR COMMUNICATION NETWORK

The present invention relates to a method for processing of calls terminating in a packet switched protocol based communication network that comprises a packet switched based cellular telephone network, for instance, an Internet Protocol based GSM (Global System of Mobile communication) network, and a further network, for instance, an internet protocol network or a general switched telephone network (GSTN) that is coupled to the cellular telephone network by means of an interface comprising a signalling information exchange function and a call or payload information exchange function between the cellular telephone network and the GSTN.

Recently, there have been made attempts in a more and more increasing manner to couple and to integrate a mobile cellular telephone network, for instance, the GSM network that is generally a circuit switched network to a further kind of networks, called packet switched networks, for instance, an internet protocol network or VOIP (Voice on Internet Protocol) network, wherein call information is transferred in the form of "packets" between the called member and the calling member and vice versa. The packet switched network uses several different ways or through-connections to transfer the packets between the users, whereas in the circuit switched world, for instance, the GSM network, a through-connection is established within the network and, as long as the through-connection is maintained, the whole call information including signalling and payload information is transferred via the through-connection in the circuit switched network between the users.

A through-connection in a communication network that comprises, for instance, a GSM network or a similar cellular telephone network and an internet protocol network or packet switched network being coupled with each other by interface means is established in the conventional cellular telephone network via a base transceiver station, a base station controller and a mobile services switching centre to the interface that in turn is coupled to the internet protocol network or packet switched network. Each node in a packet switched network which processes the payload information causes some delay in the payload transport. This renders the known architecture of the GSM telephone network improper or not very well suited for coupling and integration to a packet switched network, for instance, an internet protocol network or similar network.

Thus it is an object of the present invention to provide a communication network that has a packet switched protocol cellular telephone network architecture and a method for processing information flow of calls terminating in this communication network which minimise the delay problems and bandwidth requirements.

Accordingly, the communication network of the invention has a packet switched protocol based cellular telephone network comprising a first layer for transferring signalling information assigned to a telephone call being processed by the communication network, a second layer for transferring payload information assigned to the telephone call and interface means for coupling the cellular telephone network to a further network, e.g. a general switched telephone network (GSTN), the interface means comprising signalling information exchange function between the cellular telephone network and the further network and payload information exchange function between the cellular telephone network and the further network, the first layer and the second layer of the cellular telephone network being coupled to the interface means, wherein the second layer of the cellular telephone network transfers the payload information of the telephone call to and from the interface means on a direct route assigned to the telephone call within the second layer and the first layer of the cellular telephone network comprises controlling means, e.g. a gateway mobile services switching center, for controlling the routing of the telephone call initiated from the further network and terminating in the packet switched protocol based cellular telephone network.

Since in the invention the payload of a call is routed directly within the second layer of the cellular telephone network to or from the interface means the payload information is not transferred via the longer and more time consuming way of the conventional systems, i.e., for instance, the mobile services' switching center of a conventional GSM network, and, therefore, a corresponding delay in the cellular telephone network and the delay and bandwidth problems involved therewith are minimised or they are avoided in the communication network of the invention.

The interface means can comprise media gateway means for payload information exchange between the cellular telephone network and the further network and the mobile services switching center can be connected to the media gateway means to control the media gateway means. By selecting the mobile service switching center as media gateway controller, a large part of the conventional GSM functionality can be reused in the communication network of the invention and the media gateway functionality can be kept simple in the communication network of the invention.

The inventive method for processing a telephone call in a packet switched protocol based communication network comprising a further network, e.g. a general switched telephone network (GSTN), and a packet switched protocol based cellular telephone network having a first layer for transferring signalling information assigned to the telephone call being processed by the communication network, a second layer for transferring payload information assigned to the telephone call, and interface means for coupling the cellular telephone network to the further network, the interface means comprising a signalling information exchange function and a payload information exchange function between the cellular telephone network and the GSTN network, the first layer and the second layer of the cellular telephone network being coupled to the interface means, wherein the method of the invention comprises:

- initiating a call by the further network, forwarding an initial address message assigned to the call from the further network to the cellular telephone network;
- after receiving the initial address message, providing routing information by the cellular telephone network on the basis of the initial address message in order to route the call to a terminating mobile station of the cellular telephone network and
- establishing a through-connection for transferring payload information assigned to the call within the packet switched protocol based cellular telephone network from the terminating mobile station via the second layer and the interface means to the further network and/or vice versa.

Further advantageous improvements and embodiments of the present invention are mentioned in the dependent claims. Further objects, advantages, advantageous improvements and applications of the invention are mentioned in the following description of a preferred embodiment of the invention in connection with the enclosed figures, that show:

FIG. 1 a schematic block diagram of a first embodiment of the inventive communication network which has a packet switched protocol based GSM network being coupled to a GSTN network as further network, for instance, an Internet Protocol based network; and FIG. 2 a signalling flow example for illustrating and explaining the processing of a call being initiated from the GSTN network and terminating within the communication network shown in FIG. 1;

FIG. 3 a schematic block diagram and a signalling flow example of a second embodiment of the inventive communication network and method for illustrating and explaining the processing of a call being initiated from a GSTN network as further network and terminating within the communication network of the second embodiment; and FIG. 4 a schematic block diagram and a signalling flow example of a third embodiment of the inventive communication network and method for illustrating and explaining the processing of a call being initiated from the GSTN network as further network and terminating within the communication network of the third embodiment.

In the FIG. 1 a schematic block diagram of a preferred embodiment of the communication network of the invention is shown which comprises, for instance, a packet switched protocol based GSM network 1 as packet switched protocol based cellular telephone network, e.g. an internet protocol based cellular telephone network, and a GSTN network 2 as further network that is coupled to the GSM network 1 by means of an interface 20 that comprises, for instance, a signalling gateway 21 (SGW) and a media gateway 10 (MGW) which are a part of the GSM network 1.

The cellular telephone network 1 is divided into a first layer 3 or level, also called an application or signalling information processing and transferring platform, comprising application and network service functions and into a second layer 4 or level, also called a transmission or payload information transferring platform, that comprises call information transmission or payload transmission, for instance, in an internet protocol format. Further interface means 20 are provided in order to couple the cellular telephone network 1 to the GSTN network 2 for bi-directional information exchange between these networks.

The second layer 4 of the GSM network 1 comprises several base transceiver stations (BTS) 7, 8 and 9 as part of a base station subsystem. Each base transceiver station 7, 8, 9 houses the radio transceivers that define a cell being assigned to a cell area and handles the radio link protocol 6 that is the connection to a number of fixed or mobile stations 5 existing in the corresponding cell area.

As shown in FIG. 1 on the second layer 4, the base transceiver station 8 is connected by means of a direct payload connection 11 or route, also called a through-connection, to the media gateway 10 of the interface means 20. The base transceiver station 8, therefore, comprises the functionality and protocol for sending and receiving call and payload information from or to the media gateway via the direct payload connection 11. Further, in order to serve the BSC/BTS device control connection 13 between the base transceiver station 8 and the base station controller 14, control protocol software is implemented on both the base transceiver station 8 and the base station controller 14 on the basis of a device control protocol, for example MGCP (Media Gateway Control Protocol) protocols.

The media gateway 10 substantially provides a payload conversion between the packet switched protocol based. GSM network 1 and the GSTN 2. The media gateway 10 of the interface means 20 comprises devices such as transcoders, speech transcoders, modems, a network access server etc. Since the transcoders are provided within the media gateway of the interface 20, the bandwidth requirements are minimised. Further the media gateway 10 comprises the functionality and control software being required for transferring payload or call information directly to the base transceiver stations 7, 8, 9. On the direct connection 11 from the base transceiver station 8 to the media gateway payload information is transferred with a rate, for instance, of 13 kbps. On the connection from the media gateway 10 to the further network 2 or the internet protocol network the transmission rate corresponds to, for instance, 64 kbps.

The first layer 3 of the packet switched protocol based GSM cellular telephone network used in the invention comprises a number of base station controllers, wherein in the FIG. 1 one base station controller 14 (BSC) is shown, a number of mobile services switching centres, wherein one mobile switching center. 16 (MSC) is shown in FIG. 1, a home location register 18 (HLR), a number of visitor location registers, wherein only one visitor location register 23 (VLR) is shown in the FIG. 1, and a gateway mobile services switching center 19 (GMSC) that provides signalling and routing of calls initiated in the GSTN network 2 and terminating in the packet switched protocol based GSM network 1. Signalling land payload information between the GMSC 19, the home location register 18, the visitor location register(s) 23, the mobile services switching center(s) 16, base station systems (BSS) comprising base station controller(s) 14 and assigned base transceiver station(s) 8 of the packet switched protocol based GSM network 1 is transported over packet switched protocol, for instance, the internet protocol.

The home location register 18 contains all the administrative information of each subscriber registered in the GSM network 1 along with the current VLR-location of the mobile stations 5. The visitor location register 23 contains selected administrative information from the home location register 18 necessary for call control and provision of the subscribed services for each fixed station or mobile station 5 currently located in the geographical area controlled by the visitor location register 23. The home location register 18 and the visitor location register 23 together with the mobile services switching center 16 and the GSMC 19 provide the call routing and possibly international roaming capabilities of the GSM network 1. Further units, for instance, the equipment identity register that contains a list of valid mobile equipment on the GSM network and an authentication centre are not shown in the figures.

The base station controller 14 and the mobile services switching centre 16 are connected via a MSC/BSC application signalling protocol connection 15. The mobile services switching centres 16 and the visitor location register 23 shown as one unit in the FIG. 1 are also connected to the home location register 18 via an MSC/HLR application signalling protocol connection 12. The application signalling protocol connection 15 is, for instance, implemented on the basis of the known MAP (Mobile Application Part) or BSSMAP (Base Station System Management Application Part) protocols.

The GMSC 19 provides routing of calls terminating in the packet switched protocol based GSM network 1 by selecting the mobile services switching center(s) 16 on the basis of routing and roaming information stored in the home location register 18 and in the visitor location register(s) 23. The GMSC 19 is coupled to the signalling gateway 21 of the interface means 20 by means of a trunk signalling protocol connection 22 supported, for instance, on the basis of an ISUP (ISDN User Part) protocol. Further, the GMSC 19 is coupled to the home location register 18 by means of a HLR/GMSC signalling connection 24 based on an application signalling protocol, and it is coupled to the mobile services switching center by means of a MSC/GMSC signalling connection 25 based on a trunk signalling protocol.

The mobile services switching centre 16 provides all the functionality needed to handle a mobile subscriber or a mobile station 5, such as registration, authentication, location updating and call routing to a roaming subscriber. Further, in the mobile services switching center 16 a MSC device control protocol is implemented for controlling the media gateway 10 of the interface means 20 via a MSC/MGW device control connection 17 between the media gateway 10 and the mobile services switching center 16. For instance, this MSC device control protocol can be implemented in the mobile services switching center 16 on the basis of a media gateway control protocol (MGCP) or device control protocol. The mobile services switching center 16 is also coupled to the base station controller 14 by means of an MSC/BSC application signalling connection supported by a signalling protocol.

On the layer 3 of the GSM network, the signalling gateway 21, for instance, a SS7 gateway (SS7=Signalling System No. 7), as part of the interface means 20 is shown which, for instance, provides signalling bearer conversions between circuit or packet switched protocols and packet switched protocols or vice versa. It may also provide application level signalling conversions between different protocols. The signalling gateway 21 is connected to the GSTN network 2 via a trunk or a GSTN/SGW signalling connection 27.

A number of options for operating and connecting the interface means to an internet protocol network or to the GSTN network 2 are described in detail in the internet draft draft-ietf-megaco-reqs-oo.txt on http://www.ietf.cnri.reston.va.us/ID.html, having the title "Media Gateway Control Protocol Architecture and Requirements", dated January 1999.

In the following the inventive processing of a call originating from the GSTN network 2 and terminating in the homogenous packet switched protocol based GSM network 1 of the FIG. 1 is described and explained wherein the handling of access to the GSM network 1 is described by steps 1. to 35. shown in the FIG. 2.

In step 1. "IAM (SIF, Signalling Information Field )", a call set-up is initiated by the GSTN network 2 by transferring and forwarding an initial address message from the GSTN network 2 to the signalling gateway 21 of the interface 20 via the GSTN/SGW signalling connection extending between the GSTN network 2 and the signalling gateway 21 to the signalling gateway 21 of the interface 20. The step 1. is carried out on the basis of an ISUP protocol.

Afterwards, in step 2. "IAM (SIF)", the signalling gateway 21 relays or sends the message indicated by the SIF from GSTN to the gateway mobile services switching centre (GMSC) 19 via the trunk signalling connection 22 extending between the signalling gateway 21 and the GMSC 19, wherein the signalling gateway 21 only converts the signalling bearer. Transferring of the initial address message from the signalling gateway 21 to the GMSC 19 is carried out on the basis of the ISUP protocol.

After receiving the initial address message from the signalling gateway 21, the GMSC 19 sends a send routing information request to the home location register (HLR) 18 of the GSM network 1 in order to interrogate the home location register 18 for routing information. The send routing information request or message is transferred via the HLR/GMSC signalling connection 24 that extends between the GMSC 19 and the home location register 18. The signalling on the HLR/GMSC signalling connection 24 is supported by a MAP protocol (Management Application Part). This procedure is shown by step 3. "SRI" in the FIG. 2.

Next, in step 4. "PRN", the home location register 18 sends a provide roaming number request via the HLR/VLR (MSC) signalling connection 12 to the terminating visitor location register 23 in order to request a roaming number from the visitor location register 23. This step 4., again, is supported by the MAP protocol.

In step 5. "PRN", after receiving the provide roaming number request from the home location register 18, the visitor location register 23 returns the requested roaming number to the home location register 18, wherein the step 5. is supported by the MAP protocol.

Then, in step 6. "SRI", the home location register 18 forwards a send routing information message to the GMSC 19 via the HLR/GMSC signalling connection 24 supported by the MAP protocol in order to return the requested routing information to the GMSC 19.

In the next step 7. "IAM (SIF)", after receiving the send routing information message from the home location register 18, the GMSC 19 forwards the initial address message via the MSC/GMSC trunk signalling connection 25 to the mobile services switching centre 16 in order to route the call to the terminating mobile services switching centre 16 on the basis of the received routing information from the home location register 18. The GMSC 19 selects a new signalling information field (SIF) identifying the signalling connection between the GMSC 19 and the MSC 16 and the GMSC 19 includes both the new signalling information field and the signalling information field as received in step 2., mentioned above, into the initial address message being routed from the GMSC 19 to the mobile services switching centre 16. Alternatively, the GMSC provides the signalling information field received in step 2., mentioned above, via another protocol, e.g. an inter-media gateway controller protocol, to the mobile services switching center 16. The signalling on the MSC/GMSC trunk signalling connection 25 is supported by the ISUP protocol.

Afterwards in step 8. "Paging/RESP", after receiving the initial address message from the GMSC 19, the mobile services switching centre 16 forwards a paging request to the base station controller 14 via the MSC/BSC application signalling connection being supported by a BSSMAP (Base Station System Management Application Part) protocol in order to request the base station controller.14 to page the mobile station 5. After having paged the mobile station 5, the base station controller 14 returns the paging response or result to the mobile services switching centre 16 via the MSC/BSC application signalling connection 15.

Afterwards, in step 9. "SETUP", after receiving the paging response from the base station controller 14, the mobile services switching centre 16 requests a new call set-up by forwarding a set-up request to the mobile station 5 via a DTAP protocol connection 28 between the mobile services switching centre 16 and the mobile station 5. DTAP means direct transfer application part and is a function within a protocol layer for communication and signalling between the mobile station 5 and the mobile services switching centre 16. The physical connection from the mobile station 5 to the mobile services switching centre 16 and vice versa is realised via the radio link 6, the base transceiver station 8 and the base station controller 14 to the mobile services switching centre 16 in upward direction and in downward direction via the units 14, 8 and 6 to the mobile station 5. Accordingly, in the following description of the present invention, mentioning of the DTAP protocol connection always means, that signals and information of the DTAP protocol have to pass the base station controller 14, the base transceiver station 8 and the radio link 6.

In step 10., the mobile station 5 forwards a call confirmed message via the DTAP protocol connection 28 to the mobile services switching centre 16 in order to confirm the call set-up to the mobile'services switching centre 16.

Afterwards, in step 11. "ASSREQ", the mobile services switching centre 16 generates and stores a network unit call identification (call ID) assigned to the call and includes the call identification into an assignment request message that is forwarded from the mobile services switching centre 16 via the MSC/BSC application signalling connection 15 to the base station controller 14 in order to request a traffic channel from the base station controller 14. The step 11., is supported by a modified BSSMAP protocol.

Next, in step 12., "CreaCon" the base station controller 14 stores the call identification and forwards a create connection request to the base transceiver station 8 in order to request the base transceiver station 8 to reserve resources for a new connection assigned to the call initiated by the GSTN network 2. The base station controller 14 includes a through-connection indicator into the create connection request forwarded to the base transceiver station 8 wherein the through-connection indicator indicates a both-way through-connection to be established between the base transceiver station 8, the MS and the media gateway 10. The step 12. is supported by the media gateway control protocol (MGCP) adapted to the packet switched protocol based or internet protocol based GSM network 1 being used in the present invention.

Next, in step 13. "CreaConAck", after receiving the create connection request from the base station controller 14, the base transceiver station 8 reserves the applicable resources for the create connection request and maps the call identification received from the base station controller into a BSC-BTS internal connection identification. Further, the base transceiver station 8 provides a local connection description order base transceiver station address, BTS address, that is a reference by which means another node within the GSM network 1 can address the base transceiver station 8 and the call individual within the base transceiver station 8. The base transceiver station 8, then, forwards a create connection acknowledge message to the base station controller 14 via the BSC/BTS device control connection 13 supported by the MGCP protocol. The create connection acknowledge message comprises the BTS address and the BSC/BTS internal connection identification.

After receiving the create connection acknowledge message from the base transceiver station 8, in step 14. "ASS COMPL", the base station controller 16 stores the BSC/BTS internal connection identification and forwards an assignment complete message comprising the BTS address to the mobile services switching centre 16 via the MSC/BSC application signalling connection 15 in order to acknowledge the traffic channel assignment request to the mobile services switching centre 16. This step 14. is supported by the BSSMAP protocol.

Then, instep 15. "CreaCon", after receiving the assignment complete message from the base station controller 14, the mobile services switching centre 16 forwards a create connection request via the MSC/MGW device control connection 17 supported by a modified MGCP protocol to the media gateway 10 in order to request the media gateway 10 to reserve resources for a new connection assigned to the initiated call. The create connection request comprises the BTS address information, the GSM bearer capability and the selected signalling information field.

Then, in step 16., "CreaConck", after receiving the create connection request from the mobile services switching centre 16, the media gateway 10 reserves all necessary resources for the new request and maps the call identification into a MGW-MSC internal connection identification. Further the media gateway 10 provides a local connection description or MGW address that is a reference by which means another node within the GSM network 1 can address the media gateway 10 and the call individual within the media gateway 10. The media gateway 10, then, forwards a create connection acknowledge message. comprising the MGW address via the MSC/MGW device control connection 17 to the mobile services switching centre 16. Again, the step 16. is supported by the MGCP protocol.

In the next step 17., "UPD CON", after receiving the create connection acknowledge message from the media gateway 10, the mobile services switching centre 16 stores the MGW-MSC internal connection identification and forwards an update connection request to the base station controller 14 via the MSC/BSC application signalling connection, wherein the up-date connection request comprises the MGW address of the media gateway 10. The step 17. is supported by the BSSMAP protocol adapted to packet switching and signalling and call processing shown in FIG. 2.

In step 18. "ModCon", after receiving the update connection request from the mobile services switching centre 16, the base station controller 14 forwards a modify connection request via the BSC/BTS device control connection 13 supported by the MGCP protocol to the base transceiver station 8 in order to inform the base transceiver station 8 about the MGW connection description, i.e., the modification connection request comprises the MGW address assigned to the media gateway 10.

In step 19. "ModConAck", the base transceiver station 8 forwards a modify connection acknowledge via the BSC/BTS device control connection 13 to the base station controller 14 in order to acknowledge the modification to the base station controller 14. The base transceiver station 8 stores the MGW address. Again this step 19. is supported by the MGCP protocol.

Next, in step 20., "UPD COMPL", after receiving the modify connection acknowledge message from the base transceiver station 8, the base station controller 14 forwards an update complete message via the MSC/BSC application signalling connection 15 supported by the BSSMAP protocol to the mobile services switching centre 16 in order to inform the mobile services switching centre 16 about the completion of the modification carried out in the base transceiver station 8.

In step 21., "ALERTING", the mobile station 5 forwards an alerting message via the DTAP protocol connection 28 to the mobile services switching centre 16 in order to inform the mobile services switching centre 16 about the alerting.

In step 22., "ModCon" the mobile services switching centre 16 forwards a modify connection request via the MSC/MGW device control connection 17 supported by the MGCP protocol to the media gateway 10 in order to request the media gateway 10 to perform a backward through-connection.

In step 23. "ModConAck", after receiving the modify connection request from the mobile services switching centre 16, the media gateway 10 forwards a modify connection acknowledge message via the MSC/MGW device control connection 17 supported by the MGCP protocol to the mobile services switching centre 16 in order to acknowledge the backward through-connection.

Afterwards in step 24. "ACM", the mobile services switching centre 16 sends an address complete message via the MSC/GMSC application signalling connection 25 supported by the ISUP protocol to the GMSC 19 in order to acknowledge the call set-up to the GMSC 19.

Afterwards, in step 25. "ACM", after receiving the address complete message from the mobile services switching centre 16, the GMSC 19 forwards the address complete message via the trunk signalling connection 22 supported by the ISUP protocol to the signalling gateway 21. In step 26., "ACM", the signalling gateway 21, then, forwards the address complete message to the GSTN network 2 under support of the ISUP protocol via the GSTN/SGW signalling connection 27 wherein the signalling gateway 21 only converts the signalling bearer to be adapted to the requirements of the GSTN network 2.

In step 27., after receiving the address complete message from the signalling gateway 21 in the GSTN network 2, a backward through-connection has been established from the media gateway 10 via the GSTN/MGW payload transferring connection 26 to the GSTN network 2.

In step 28., "CONNECT", the mobile station 5 forwards a connect message via the DTAP protocol connection 28 to the mobile services switching centre 16 in order to inform the mobile services switching centre 16 about the call answer. This step is supported by the DTAP protocol.

In step 29. "ModCon", after receiving the connect message from the mobile station 5, the mobile services switching centre 16 forwards a modify connection request via the MSC/MGW device control connection 17 to the media gateway in order to request a both-way through-connection from the media gateway 10. This step 29. is supported by the MGCP protocol.

In step 30. "ModConAck", after receiving the modify connection request from the mobile services switching centre 16, the media gateway 10 forwards a modify connection acknowledge message again via the MSC/MGW device control connection 17 to the mobile services switching centre 16 in order to acknowledge to the mobile services switching centre 16 the receipt of the modify connection request and the both-way through-connection. The step 30. is supported by the MGCP protocol.

In step 31., the mobile services switching centre sends an answer message received from the mobile station 5 via the MSC/GMSC application signalling connection supported by the ISUP protocol to the GMSC 19 in order to inform the GMSC 19 about the answer of the called party.

In step 32., "ANM", the GMSC 19 forwards the answer message to the signalling gateway 21 via the trunk signalling connection 22 supported by the ISUP protocol, and in step 32., "ANM" the signalling gateway 21 relays the answer message received from the GMSC 19 via the GSTN/SGW signalling connection 27 to the GSTN network 2 in order to inform the GSTN network 2 about the answer of the called party, wherein the signalling gateway 21 only converts the signalling bearer.

In step 34., "CONNECT ACK", the mobile services switching centre 16 forwards a connect acknowledge message via the DTAP protocol connection 28 to the terminating mobile station 5 in order to acknowledge the call connection to the mobile station 5. After forwarding the connect acknowledge message from the mobile station 5 to the mobile services switching centre 16, a both-way through-connection has been established between the mobile station 5 being the called party and the GSTN 2 comprising the calling party or node via the radio link 6, the base transceiver station 8, the direct payload connection 11 between the base transceiver station 8 and the media gateway 10, the media gateway 10 and the GSTN/MGW payload transferring connection 26 to the GSTN network 2.

Next, a second embodiment of the communication network and method of the invention for illustrating and explaining the processing of a call being initiated from the GSTN network and terminating within the communication network of the second embodiment is described in accordance to FIG. 3.

The communication network of the second preferred embodiment of the present invention comprises a packet switched protocol based GSM network 1.1 and a GSTN network 2 as further network coupled to the GSM network 1.1 by means of interface means being a part of the GSM network The packet switched protocol based GSM network 1.1 that, for instance, is based on the internet protocol, comprises at least one mobile services switching centre 1.16, at least one visitor location register (VLR) 1.23 coupled to the mobile services switching center 1.16, the interface means comprising a media gateway 1.10, a gateway mobile services switching centre 1.19 and a signalling gateway 1.21 and a home location register 1.18.

The gateway mobile services switching centre 1.19 is a circuit switched protocol based GMSC connected via a MGW/GMSC payload connection 32 to the media gateway 1.10, via a GMSC/GSTN payload connection 31 to the GSTN network 2, via a GMSC/GSTN signalling connection 33 to the GSTN network 2, via a trunk signalling connection 1.22 to the signalling gateway 1.21 and via a HLR/GMSC signalling connection 1.24 to the home location register 1.18 (HLR).

Further the GSM network 1.1 shown in FIG. 3 comprises a number of base station controllers wherein in FIG. 3 only one base station controller 1.14 is shown and a number of base transceiver stations wherein in FIG. 2 only the base transceiver station 1.8 is shown that is connected to the media gateway 1.10 by a direct payload connection 1.11, to the base station controller 1.14 by a BSC/BTS device controller connection 1.13 and to a number of mobile stations, only one 1.5 of them is shown in the FIG. 3, via the radio link 1.6.

The mobile services switching centre 1.16 is connected to the base station controller 1.14 via a MSC/BSC application signalling connection 1.15, to the media gateway 1.10 via the MSC/MGW device control connection 1.17 and to the mobile station 1.5 via a DTAP protocol connection 1.28 in order to exchange signalling information. Further the mobile services switching centre 1.16 is connected to the signalling gateway 1.21 via a MSC/SGW signalling connection in order to exchange signalling information between the mobile services switching centre 1.16 and the signalling gateway 1.21. The home location register 1.18 is connected via the HLR/SGW signalling connection to the signalling gateway 1.21 in order to exchange signalling information between the home location register 1.18 and the signalling gateway 1.21.

The mobile service switching center 1.16, the base station controller 1.14, the base transceiver station 1.8 and the visitor location register.1.23 are packet switched protocol based units whereas the GMSC 1.19 and the home location register 1.18 are circuit switched protocol based units. Thus, the GSM network 1.1 is a "heterogeneous" network.

In the following the processing of a call initiated within the GSTN network 2 and to be terminated in the GSM network 1.1 is described in order to explain the handling of access to the heterogeneous GSM network 1.1. In the FIG. 3, the processing is illustrated by the steps 101. to 135.

In step 101., the GSTN 2 forwards via the GMSC/GSTN signalling connection 33 an initial address message to the GMSC 1.19 under support of the ISUP protocol in order to initiate a call set-up to the GMSC 1.19. Then, in step 102. "SRI", the GMSC 1.19 sends a send routing information request via the HLR/GMSC signalling connection 1.24 to the home location register 1.18 in order to interrogate the home location register 1.18 for routing information assigned to the initiated call wherein the step 102. Is carried out on the basis of a MAP protocol.

In step 103., "PRN", after receiving the send routing information request from the GMSC 1.19, the home location register 1.18 forwards a provide roaming number request via the HLR/SGW signalling connection 29 to the signalling gateway 1.21 in order to request a roaming number from the terminating visitor location register 23 on the basis of the information stored in the home location register 1.18 and in the address message. This procedure is supported by the MAP (Management Application Part) protocol.

Afterwards in step 104. "PRN", the signalling gateway 1.21 forwards the provide roaming number request from the home location register 1.18 to the selected visitor location register 1.23 via the MSC/SGW signalling connection 30 and the mobile services switching centre 1.16 wherein the signalling gateway 1.21 only converts the signalling bearer. After receiving the provide roaming number request from the signalling gateway 1.21, the visitor location register 23 forwards a send routing information message via the mobile services switching centre 1.16 and the MSC/SGW signalling connection 30 to the signalling gateway 1.21. The signalling gateway 1.21 forwards the received send routing information message to the home location register 1.18 after converting the signalling bearer. This procedure again is supported by the MAP protocol.

Afterwards, in step 105., "SRI", the home location register 1.18 forwards the send routing information message via the HLR/GMSC signalling connection 1.24 to the GMSC 1.19 in order to return the requested routing information to the GMSC 1.19.

Then, in step 106., the GMSC 1.19 determines a new signalling information field (SIF) value and initiates a new call set-up by forwarding the initial address message comprising the new signalling information field value via the trunk signalling connection 1.22 to the signalling gateway 1.21 in order to route the call to the terminating mobile services switching centre 1.16 on the basis of the received routing information from the home location register 1.18.

After receiving the initial address message from the GMSC 1.19, in step 107. "IAM (SIF)", the signalling gateway 1.21 forwards the initial address message to the mobile services switching centre 1.16 via the MSC/SGW signalling connection 30, wherein the signalling gateway 1.21 converts the signalling bearer in order to relay the initial address message to the mobile services switching centre 1.16. Steps 106. and 107. are supported by the ISUP protocol.

Afterwards, in step 108. "PAGING/RESP", after receiving the initial address message from the signalling gateway 1.21, the mobile services switching centre 1.16 forwards a paging request to the base station controller 1.14 via the MSC/BSC application signalling connection 1.15 being supported by a BSSMAP (Base Station System Management Application Part) protocol in order to request the base station controller 1.14 to page the mobile station 1.5. After having paged the mobile station 5, the base station controller 1.14 returns the paging response or result to the mobile services switching centre 1.16 via the MSC/BSC application signalling connection 1.15.

Afterwards, in step 109. "SETUP", after receiving the paging response from the base station controller 1.14, the mobile services switching centre 1.16 requests a new call set-up by forwarding a set-up request to the mobile station 1.5 via the DTAP protocol connection 1.28 being established between the mobile services switching centre 1.16 and the mobile station 1.5.

In step 110., the mobile station 1.5 forwards a call, confirmed message via the DTAP protocol connection 1.28 to the mobile services switching centre 1.16 in order to confirm the call set-up to the mobile services switching centre 1.16.

Afterwards, in step 111. "ASS REQ", the terminating mobile services switching centre 1.16 generates and stores a network unit call identification assigned to the call and includes the call identification into an assignment request message. This assignment request message is forwarded from the mobile services switching centre 1.16 to the base station controller 1.14 via the MSC/BSC application signalling connection 1.15 supported by a modified BSSMAP protocol in order to request a traffic channel from the base station controller 1.14.

Next, in step 112., "CreaCon" the base station controller 1.14 stores the call identification (Call ID) and forwards a create connection request to the base transceiver station 1.8 in order to request the base transceiver station 1.8 to reserve resources for a new connection assigned to the call initiated by the GSTN 2. The base station controller 1.14 includes a through-connection indicator into the create connection request forwarded to the base transceiver station 1.8 wherein the through-connection indicator indicates a both-way through-connection to be established between the base transceiver station 1.8 and the media gateway 1.10. The step 112. is supported by the media gateway control protocol (MGCP) adapted to the GSM network 1.1.

Next, in step 113., "CreaConAck", after receiving the create connection request from the base station controller 1.14, the base transceiver station 1.8 reserves the applicable resources for the create connection request and maps the call identification received from the base station controller 1.14 into a BSC-BTS internal connection identification. Further, the base transceiver station 1.8 provides a local connection description or base transceiver station address, BTS address, that is a reference by which means another node within the GSM network 1.1 can address the base transceiver station 1.8 and the call individual within the base transceiver station 1.8. The base transceiver station 1.8, then, forwards a create connection acknowledge message to the base station controller 1.14 via the BSC/BTS device control connection 1.13 supported by the MGCP protocol. The create connection acknowledge message comprises the BTS address and the BSC/BTS internal connection identification.

After receiving the create connection acknowledge message from the base transceiver station 8, in step 114. "ASS COMPL (CON ID, CON DES)", the base station controller 1.14 stores the BSC/BTS internal connection identification and forwards an assignment complete message comprising the BTS address to the mobile services switching centre 1.16 via the MSC/BSC application signalling connection 1.15 in order to acknowledge the traffic channel assignment request to the mobile services switching centre 16. This step 14., is supported by the modified BSSMAP protocol.

Then, in step 115. "CreaCon", after receiving the assignment complete message from the base station controller 1.14, the mobile services switching centre 1.16 forwards a create connection request via the MSC/MGW device control connection 1.17 supported by the modified MGCP protocol to the media gateway 1.10 in order to request the media gateway 10 to reserve resources for a new connection assigned to the initiated call. The create connection request comprises the BTS address information, the GSM bearer capability and the selected signalling field.

Then in step 116., "CreaConAck", after receiving the create connection request from the mobile services switching centre 1.16, the media gateway 1.10 reserves all necessary resources for the new request and maps the call identification into a MGW-MSC internal connection identification. Further the media gateway 1.10 provides a local connection description or MGW address that is a reference by which means another node within the GSM network 1 can address the media gateway 1.10 and the call individual within the media gateway.1.10. The media gateway 1.10 then forwards a create connection acknowledge message comprising the MGW address and the MGW-MSC internal connection identification via the MSC/MGW device control connection 1.17 to the mobile services switching centre 1.16. The step 116. is supported by the MGCP protocol.

In the next step 117. "UPD CON (CALL ID, REM CON DES)", after receiving the create connection acknowledge message from the media gateway 1.10, the mobile services switching centre stores the MGW-MSC internal connection identification and forwards an update connection request to the base station controller 1.14 via the MSC/BSC application signalling connection 1.15, wherein the up-date connection request comprises the MGW address of the media gateway 1.10. The step 117. is carried out on the basis of the BSSMAP protocol.

After receiving the up-date connection request from the mobile services switching centre 1.16, the base station controller 1.14 forwards a modify connection request via the BSC/BTS device control connection 1.13 supported by the MGCP protocol to the base transceiver station 1.8 in order to inform the base transceiver station 1.8 about the MGW connection description, i.e., the modification connection request comprises the MGW address assigned to the media gateway 1.10.

In step 119. "MOD CON ACK" the base transceiver station 1.8 forwards a modify connection acknowledge via the BSC/BTS device control connection 1.13 to the base station controller 1.14 in order to acknowledge the modification to the base station controller 1.14. The base transceiver station 1.8 stores the MGW address. Again this step 119. is supported by the MGCP protocol.

Next, in step 120., "UPD COMPL", after receiving the modify connection acknowledge message from the base transceiver station 1.8, the base station controller 1.14 forwards an up-date complete message via the MSC/BSC application signalling connection 1.15 supported by BSS-MAP protocol to the mobile services switching centre 1.16 in order to inform the mobile services switching centre 1.16 about the completion of the modification carried out in the base transceiver station 1.8.

In step 121., "ALERTING", the mobile station 1.5 forwards an alerting message via the DTAP protocol connection 1.28 to the mobile services switching centre 1.16 in order to inform the mobile services switching centre 1.16 about the alerting.

In step 122., "MOD CON" the mobile services switching centre 1.16 forwards a modify connection request via the MSC/MGW device control connection 1.17 supported by the MGCP protocol to the media gateway 1.10 in order to request the media gateway 1.10 to perform a backward through-connection.

Afterwards in step 123. "ModConAck", after receiving the modify connection request from the mobile services switching centre 1.16, the media gateway 1.1.0 forwards a modify connection acknowledge message via the MSC/MGW device control connection 1.17 supported by the MGCP protocol to the mobile services switching centre 1.16 in order to acknowledge the backward through-connection.

In step 124. "ACM", the mobile services switching centre 1.16 then forwards an address complete message to the signalling gateway 1.21 via the MSC/SGW signalling connection 30 supported by the ISUP protocol in order to acknowledge set-up to the GMSC 1.19 via the signalling gateway 1.21. Afterwards the signalling gateway 1.21 forwards the address complete message to the GMSC 1.19 via the trunk signalling connection 1.22 wherein the signalling gateway 1.21 converts the signalling bearer. In the next step 126. "ACM", the GMSC 1.19 forwards the address complete message via the GMSC/GSTN signalling connection 33 to the GSTN network 2 in order to acknowledge the call set-up to the GSTN network 2.

Afterwards, in step 127. "PAYLOAD", a backward through-connection is established from the media gateway 1.10 via the MGW/GMSC payload connection 32, the GMSC 1.19 and the GMSC/GSTN signalling connection 33 to the GSTN network 2.

In step 128. "CONNECT", the mobile station 1.5 forwards a connect message to the mobile services switching centre 1.16 via the DTAP protocol connection 1.28 in order to inform the mobile services switching centre 1.16 about the call answer.

Then, in step 129. "ModCon", the mobile services switching centre 1.16 forwards a modify connect request via the MSC/MGW device control connection 1.17 to the media gateway 1.10 in order to request a both-way through-connection from the media gateway 1.10. Then, in step 130. "ModConAck", after receiving the modify connect request from the mobile services switching centre 1.16, the media gateway 1.10 forwards a modify connect acknowledge message to the mobile services switching centre 1.16 via the MSC/MGW device control connection 1.17 in order to acknowledge the both-way through-connection. This procedure is supported by the MGCP protocol.

Next, in step 131. "ANM", the mobile services switching centre 1.16 sends the answer message via the MSC/SGW signalling connection 30 to the signalling gateway 1.21. Afterwards, in step 132. "ANM", the signalling gateway 1.21 forwards the answer message received from the mobile services switching centre 1.16 via the trunk signalling connection 1.22 after converting the signalling bearer to the GMSC 1.19. In the next step 133. "ANM", after receiving the answer message from the signalling gateway 1.21, the GMSC 1.19 forwards the answer message via the GMSC/GSTN signalling connection 33 to the GSTN network 2 in order to inform the GSTN about the called party answer. The steps 131. to 133. are supported by the ISUP protocol.

In step 134. "CONNECT ACK", the mobile services switching centre 1.16 forwards a connect acknowledge message to the mobile station 1.5 via the DTAP protocol connection 1.28 in order to acknowledge the call connection to the mobile station 1.5.

Afterwards, a both-way through-connection is established between the mobile station 1.5 and the GSTN 2 via the radio link 1.6, the base transceiver station 1.8, the direct payload connection 1.11, the media gateway 1.10 the MGW/GMSC payload connection 32, the GMSC 1.19 and the GMSC/ GSTN payload connection 31 in order to transfer payload information of the call on a direct route or connection from the base transceiver station 1.8 via the media gateway 1.10 and the GMSC 1.19 to the GSTN 2 wherein the payload transferring rate on the direct payload connection 1.11 is, for instance, 13 kbps and the payload transferring rate on the MGW/GMSC payload connection 32 and on the GMSC/ GSTN payload connection 31 is, for instance, 64 kbps in both directions.

Next, a third preferred embodiment of the communication network and method of the invention shown in the FIG. 4 is described which illustrates and explains the processing of a call terminating within the communication network of the third embodiment.

The third embodiment of the packet switched protocol based communication network of the invention comprises a heterogeneous packet switched protocol based GSM network 2.1 coupled with the GSTN network 2 as further network by interface means being a part of the GSM network 2.1.

The GSM network 2.1 comprises a packet switched protocol based gateway mobile services switching centre 2.19 (GMSC), a packet switched protocol based home location register 2.18 (HLR), at least one traditional circuit switched protocol based mobile services switching centre 2.16 (MSC), at least one visitor location register (VLR) 2.23 and at least one traditional circuit switched protocol based base station subsystem comprising a base station controller 2.14 and a number of base transceiver stations 2.8 coupled via a radio link 2.6 to at least one mobile station 2.5. Further the GSM network 2.1 of FIG. 4 comprises a first media gateway 2.10, a second media gateway 2.11, a first signalling gateway 2.21 and a second signalling gateway 2.211, wherein the second signalling gateway 2.211 and the second media gateway 2.11 provide the interface means of the GSM network 2.1.

The base transceiver station 2.8 is connected via a BSC/ BTS device control connection 2.13 to the base station controller 2.14 and via the radio link 2.6 to the mobile station.2.5, for instance, a mobile telephone. The base station controller 2.14 is connected via a MSC/BSC application signalling connection 2.15 to the mobile services switching centre 2.16 and to the visitor location register 2.23.

The mobile services switching centre 2.16 is connected to the mobile station 2.5 via a DTAP protocol connection 2.28 for transferring signalling information between the mobile station 2.5 and the mobile services switching centre in both directions. Further the mobile services switching centre 2.16 is connected to the first media gateway 2.10 via the MSC/ MGW payload connection 34 in order to transfer payload information of a call from the mobile services switching centre 2.16 to the first media gateway 2.10 and vice versa. Further, the mobile services switching centre 2.16 is connected to the first signalling gateway 2.21 via a trunk signalling connection 2.22 for signalling exchange between the mobile services switching centre 2.16 and the first signalling gateway 2.21.

The first signalling gateway 2.21 is connected to the GMSC 2.19 via a SGW/GMSC signalling connection 36 and it is connected to the home location register 2.18 via a HLR/SGW signalling connection 2.29. The home location register 2.18 is connected to the GMSC 2.19 via a HLR/ GMSC signalling connection 2.24.

The GMSC 2.19 is connected to the first media gateway (MGW) 2.10 via the first GMSC/MGW signalling connection 38.1, and it is connected to the second media gateway 2.11 via the second GMSC/MGW signalling connection 38. Further the GMSC 2.19 is connected to the second signalling gateway 2.211 via the GMSC/SGW signalling connection 37. The second signalling gateway 2.211 is coupled to the GSTN network 2 via a GSTN/SGW signalling connection 2.27. Further the second media gateway 2.11 is connected to the GSTN network 2 via the GSTN/MGW payload transferring connection 2.26 and further the second media gateway 2.11 is connected to the first media gateway 2.10 via the MGW/MGW payload connection 35 in order to transfer payload between the first media gateway 2.10 and the second media gateway 2.11 or/and between the second media gateway 2.11 and the first media gateway 2.10.

In the following the processing of a call initiated from the GSTN network 2 and terminating in the heterogeneous GSM network 2.1 of the FIG. 4 is described and explained wherein the GSM network 2.1, for instance, can be a internet protocol based network. In the FIG. 4, steps 201. to 234. are shown which represent the processing of a call initiated by the GSTN 2 and terminating in the packet switched protocol based GSM network 2.1.

In step 201., "IAM (SIF)", the GSTN network 2 forwards an initial address message via the GSTN/SGW signalling connection 2.27 to the second signalling gateway 2.211 in order to initiate a call set-up. Afterwards, in step 202., the signalling gateway 2.211 forwards the initial address message received from the GSTN network 2 via the GMSC/ SGW signalling connection 37 to the GMSC 2.19 wherein the signalling gateway 2.211 only converts the signalling bearer. The steps 201. and 202. are carried out on the basis of a ISUP protocol.

Next, in step 203. "SRI", the GMSC 2.19 sends a send routing information request to the home location register 2.18 via the HLR/GMSC signalling connection 2.24 in order to interrogate the home location register 2.18 for routing information to be assigned to the initial address message and call initiated. This step 203. is supported by a MAP protocol.

Then, in step 204. "PRN"; the home location register 2.18 forwards a provide roaming number request to the first signalling gateway 2.21 via the HLR/SGW signalling connection 2.29 in order to provide a roaming number for routing of the call. Afterwards, in step 205., the signalling gateway 2.21 forwards the provide roaming number request via the trunk signalling connection 2.22 to the visitor location register 2.23 in order to relay the provide roaming number request to the visitor location register 2.23 after converting the signalling bearer.

Next, in step 206., "PRN", the visitor location register 2.23 forwards a provide roaming number message comprising the requested roaming number via the trunk signalling connection 2.22 to the first signalling gateway 2.21. Then, in step 207. "PRN", the signalling gateway 2.21 forwards the provide roaming number message received from the visitor location register 2.23 via the HLR/SGW signalling connection 2.29 to the home location register 2.18, after converting the signalling bearer, in order to provide the roaming number to the home location register 2.18. Afterwards, in step 208. "SRI" the home location register 2.18 forwards the send routing information message to the GMSC 2.19 via the HLR/GMSC signalling connection 2.24 in order to return the requested roaming and routing information to the GMSC 2.19. The steps 203. to 208. are supported by the MAP protocol.

Next in the step 209. "CreaCon", the GMSC 2.19 generates and stores a call identification assigned to the initiated call and further it provides a through-connection indicator.

The GMSC 2.19, then, forwards a create connection request via the GMSC/MGW signalling connection 38.1 to the first media gateway 2.10. The GMSC 2.19 includes the call identification, the through-connection indicator that indicates a both-way through-connection, a received ISDN bearer capability and the signalling information field into the create connection request to be forwarded to the first media gateway 2.10.

In step 210., "CreaConAck", the first media gateway 2.10 reserves the applicable resources for the new request and maps the call identification into a GMSC/MGW internal connection identification. Further the first media gate 2.10 provides its connection description or MGW address that is a reference by which means another node can address the first media gateway 2.10 and the call individual within the first media gateway 2.10 within the GSM network 2.1. The first media gateway 2.10 includes the MGW address and the GMSC/MGW internal connection identification into a create connection acknowledge message that is forwarded from the first media gateway 2.10 to the GMSC 2.19 via the GMSC/MGW signalling connection 38.1.

In step 211. "Crea Con", the GMSC 2.19 forwards a create connection message to the second media gateway 2.11 via the second GMSC/MGW signalling connection 38 in order to reserve resources in the second media gateway 2.11 for the new connection. The GMSC 2.19 includes a through-connection indicator indicating a both-way through-connection, the MGW address from the first media gateway 2.10, the ISDN bearer capability, the call identification and the signalling information field towards the GSTN network 2 into the create connection message forwarded to the second media gateway 2.11.

Afterwards, in step 112. "CreaConAck", after receiving the create connection message from the GMSC 2.19, the second media gateway 2.11 reserves the applicable resources for the new request and maps the call identification into a MGW-GMSC internal connection identification. The second media gateway 2.11 includes its MGW address, that is a reference by which means another node within the GSM network 2.1 can address the second media gateway 2.11 and the call individual within the second media gateway 2.11, and the MGW-GMSC internal connection identification into a create connection acknowledge message that is forwarded from the second media gateway 2.11 via the GMSC/MGW signalling connection 38 to the GMSC 2.19.

Then, in step 113. "ModCon", the GMSC 2.19 forwards a modify connection request via the GMSC/MGW signalling connection 38.1 to the first media gateway 2.10 in order to inform the first media gateway 2.10 about the MGW address of the second media gateway 2.11. Afterwards, in step 214., "MOD CON ACK", the first media gateway 2.10 forwards a modify connection acknowledge message to the GMSC 2.19 in order to acknowledge the requested modification to the GMSC 2.19. The modified connection acknowledge message is transferred via the GMSC/MGW signalling connection 38.1. The steps 209. to 214. are carried out on the basis of a MGCP protocol.

Then, in step 215. "IAM (SIF2)", the GMSC 2.19 forwards the initial address message to the first signalling gateway 2.21 via the SGW/GMSC signalling connection 36. Afterwards in step 216. "IAM (SIF2)", the signalling gateway 2.21 forwards the initial address message received from the GMSC 2.19 via the trunk signalling connection 2.22 to the mobile services switching centre 2.16 wherein the signalling gateway 2.21 only converts the signalling bearer and relays the initial address message to the mobile services switching centre 2.16 in order to route the call to the terminating mobile services switching centre 2.16.

Then, in step 217. "PAGING/RESP", the mobile services switching centre 2.16 forwards a paging request to the base station controller 2.14 via the MSC/BSC application signalling connection 2.15 in order to request the base station controller 2.14 to page the mobile station 2.5 and, after having paged the mobile station 2.5, the base station controller 2.14 returns the result to the mobile services switching centre 2.16 as paging response. This signalling step is supported by a protocol on the basis of the BSSMAP protocol.

Next, in step 218. "SETUP", the mobile services switching centre 2.16 sends an set-up request to the mobile station 2.5 via the DTAP protocol connection 2.28 in order to request an new call set-up. Then, in step 219. "CALL CONFIRMED", the mobile station 2.5 sends a call confirmed message via the DTAP protocol connection 2.28 to the mobile services switching centre 2.16 in order to confirm the call set-up.

In step 220. "ASS REQ", the mobile services switching centre 2.16 forwards an assignment request to the base station controller 2.14 in order to request a traffic channel from the base station controller 2.14. This signalling step is supported by the BSSMAP protocol.

In the next step 221., "ASS COMPL", the base station controller 2.14 sends an assignment complete message via the MSC/BSC application signalling connection 2.15 to the mobile services switching centre 2.16 in order to acknowledge the requested traffic channel assignment to the mobile services switching centre 2.16. The step 221. is supported by the BSSMAP protocol.

Next, in step 222. "ALERTING", the mobile station 2.5 forwards an alerting message via the DTAP protocol connection 2.28 to the mobile services switching centre 2.16 in order to inform the mobile services switching centre 2.16 about the alerting.

In step 223. "ACM", the mobile services switching centre 2.16 forwards an address complete message via the trunk signalling connection 2.22 to the first signalling gateway 2.21. Afterwards, in step 224. "ACM", the first signalling gateway 2.21 relays the message via the SGW/GMSC signalling connection 36 to the GMSC 2.19 after converting the signalling bearer. Then in step 225. "ACM", the GMSC 2.19 forwards the received address complete message via the GMSC/SGW signalling connection 37 to the second signalling gateway 2.211. In step 226. "ACM", the second signalling gateway 2.211 then forwards the address complete message to the GSTN network 2 via the GSTN/SGW signalling connection 2.27 in order to relay the message to the GSTN network 2 wherein the second signalling gateway 2.211 converts the signalling bearer. The steps 223. to 226. are carried out on the basis oft the ISUP protocol.

In step 227. "Payload", a backward through-connection is provided from the mobile services switching centre 2.16 via the MSC/MGW payload connection 34, the first media gateway 2.10, the MGW/MGW payload connection 35 extending between the first media gateway 2.10 and the second media gateway 2.11, the second media gateway 2.11 and the GSTN/MGW payload transferring connection 2.26 to the GSTN 2 on the basis of the call identification and the MGW addresses of the first media gateway 2.10 and the second media gateway 2.11.

In step 228. "CONNECT", the mobile station 2.5 forwards a connect message via the DTAP protocol connection 2.28 to the mobile services switching centre 2.16 in order to inform the mobile services switching centre 2.16 about the call answer.

Then, in step 229. "ANM", the mobile'services switching centre 2.16 forwards an answer message via the trunk signalling connection 2.22 to the first signalling gateway 2.21. Then, in step 230. "ANM", the first signalling gateway 2.21 forwards the answer message received from the mobile services switching centre 2.16 via the SGW/GMSC signalling connection 36 to the GMSC 2.19 in order to inform the GMSC 2.19 about the answer of the called party. In step 230., the first signalling gateway 2.21 converts the signalling bearer. In step 231., the GMSC 2.19 then forwards the answer message received from the first signalling gateway 2.21 via the GMSC/SGW signalling connection 37 to the second signalling gateway 2.211. Then, in step 232. "ANM", the second signalling gateway 2.211 forwards the answer message received from the GMSC 2.19 via the GSTN/SGW signalling connection 2.27 to the GSTN 2 in order to inform the GSTN 2 about the answer of the called party. The second signalling gateway 2.211 only converts the signalling bearer. Steps 228. to 232. are supported by the ISUP protocol.

In step 233., "CONNECT ACK", the mobile services switching centre 2.16 forwards a connect acknowledge message via the DTAP protocol connection 2.28 to the mobile station 2.5 in order to acknowledge the call connection to the mobile station 2.5. Afterwards in step 234., a both-way through-connection has been established from the mobile station 2.5 via the radio link 2.6, the base transceiver station 2.8, the BSC/BTS payload connection 2.13, the base station controller 2.14, the MSC/BSC payload connection 2.15, the mobile services switching centre 2.16, the MSC/MGW payload connection 34, the first media gateway 2.10, the MGW/MGW payload connection 35, the second media gateway 2.11 and the GSTN/MGW payload transferring connection 2.26 to the GSTN network 2 and vice versa.

What is claimed is:

1. A communication network having a packet switched protocol based cellular telephone network comprising a first layer for transferring signalling information assigned to a telephone call being processed by the communication network, a second layer for transferring payload information assigned to the telephone call and interface means for coupling the cellular telephone network to a further network, the interface means comprising signalling information exchange function between the cellular telephone network and the further network and payload information exchange function between the cellular telephone network and the further network, the first layer and the second layer of the cellular telephone network being coupled to the interface means, wherein the second layer of the cellular telephone network transfers the payload information of the telephone call to and from the interface means on a direct route assigned to the telephone call within the second layer and the first layer of the cellular telephone network comprises controlling means for controlling the routing of the telephone call initiated from the further network and terminating in the packet switched protocol based cellular telephone network.

2. The communication network of claim 1, wherein the controlling means for routing the telephone call comprises a gateway mobile services switching center (GMSC) and a home location register (HLR) being coupled via a HLR/GMSC signalling connection to the GMSC.

3. The communication network of claim 2, wherein the GMSC comprises a packet switched protocol based GMSC and the home location register comprises a packet switched protocol based home location register, both being operated on the basis of a packet switched protocol.

4. The communication network of claim 3, wherein the interface means comprises a signalling gateway (SGW) that is coupled to the further network via a signalling connection and to the GMSC via a GMSC/SGW signalling connection.

5. The communication network of claim 3, wherein the interface means comprises a media gateway (MGW) that is coupled to the further network via a payload connection for transferring payload information of a call from the further network to the media gateway and vice versa.

6. The communication network of claim 5, wherein the GMSC is coupled to the media gateway via a GMSC/MGW signalling connection.

7. The communication network of claim 6, wherein the packet switched protocol based cellular telephone network comprises at least one circuit switched protocol based mobile services switching center, at least one circuit switched protocol based base station controller coupled to the mobile services switching center and at least one circuit switched protocol based base transceiver station coupled to the base station controller.

8. The communication network of claim 7, wherein the packet switched protocol based cellular telephone network comprises at least one circuit switched protocol based visitor location register being coupled to the mobile services switching center.

9. The communication network of claim 7, wherein the packet switched protocol based cellular telephone network comprises a further media gateway being coupled to the mobile services switching center via a MSC/MGW payload connection for transferring payload information of the call from the mobile services switching center to the further media gateway and vice versa, the further media gateway being coupled to the other, second media gateway via a MGW/MGW payload connection for transferring payload information of the call between both of the media gateways, and the further media gateway being coupled to the GMSC via a further GMSC/MGW signalling connection.

10. The communication network of claim 7, wherein the mobile services switching center is coupled to the GMSC via a further signalling gateway.

11. The communication network of claim 10, wherein the home location register is coupled to the further signalling gateway.

12. The communication network of claim 6, wherein the packet switched protocol based cellular telephone network comprises at least one packet switched protocol based mobile services switching center, at least one packet switched protocol based base station controller coupled to the mobile services switching center and at least one packet switched protocol based base transceiver station coupled to the base station controller.

13. The communication network of claim 12, wherein the packet switched protocol based cellular telephone network comprises at least one packet switched protocol based visitor location register being coupled to the mobile services switching center.

14. The communication network of claim 12, wherein the mobile services switching center is coupled to the GMSC via a MSC/GMSC signalling connection.

15. The communication network of claim 14, wherein the home location register is coupled to the visitor location register via a signalling connection.

16. The communication network of claim 15, wherein the mobile services switching center is coupled to the media gateway via a MSC/MGW signalling connection.

17. The communication network of claim 12, wherein the base transceiver station is coupled to the media gateway via a direct payload connection for transferring payload information of the call therebetween.

18. The communication network of claim 2, wherein the GMSC comprises a circuit switched protocol based GMSC and the home location register comprises a circuit switched protocol based home location register, both being operated on the basis of a circuit switched protocol.

19. The communication network of claim 18, wherein the GMSC is coupled to the further network via a signalling connection and via a payload connection.

20. The communication network of claim 18, wherein the second layer of the packet switched protocol based cellular telephone network comprises a media gateway (MGW) that is coupled to the GMSC via a GMSC/MGW payload connection for transferring payload information of a call from the GMSC to the media gateway and vice versa.

21. The communication network of claim 20, wherein the packet switched protocol based cellular telephone network comprises at least one packet switched protocol based mobile services switching center, at least one packet switched protocol based base station controller coupled to the mobile services switching center and at least one packet switched protocol based base transceiver station coupled to the base station controller.

22. The communication network of claim 21, wherein the packet switched protocol based cellular telephone network comprises at least one packet switched protocol based visitor location register being coupled to the mobile services switching center.

23. The communication network of claim 21, wherein the mobile services switching center is coupled to the GMSC via a signalling gateway of the first layer.

24. The communication network of claim 23, wherein the home location register is coupled to the signalling gateway.

25. The communication network of claim 21, wherein the mobile services switching center is coupled to the media gateway via a MSC/MGW signalling connection.

26. The communication network of claim 21, wherein the base transceiver station is coupled to the media gateway via a direct payload connection for transferring payload information of the call therebetween.

27. The communication network of claim 1, wherein the cellular telephone network part comprises a GSM network.

28. The communication network of claim 1, wherein the further network comprises a general switched telephone network (GSTN), the GSTN comprising at least one of a packet switched network and a circuit switched network.

29. The communication network of claim 28, wherein the packet switched network comprises at least one of the Internet, a VoIP network, an Internet Protocol network, a GPRS network, and a UMTS network.

30. The communication network of claim 28, wherein the circuit switched network comprises at least one of a ISDN network, a PLMN network, and a PSTN network.

31. The communication network of one of claim 5, wherein the media gateway comprises at least one transcoder, at least one speech transcoder, and at least one of at least one modem and at least one network access server.

32. A method for processing a telephone call in a packet switched protocol based communication network comprising a further network and a packet switched protocol based cellular telephone network having a first layer for transferring signalling Information assigned to the telephone call being processed by the communication network, a second layer for transferring payload information assigned to the telephone call, and interface means for coupling the cellular telephone network to the further network, the interface means comprising a signalling information exchange function and a payload information exchange function between the cellular telephone network and the further network, the first layer and the second layer of the cellular telephone network being coupled to the interface means, the method comprising:

initiating a call by the further network, forwarding an initial address message assigned to the call from the further network to the cellular telephone network;

after receiving the initial address message, providing routing information by the cellular telephone network on the basis of the initial address message in order to route the call to a terminating mobile station of the cellular telephone network and establishing a through-connection for transferring payload information assigned to the call within the packet switched protocol based cellular telephone network from the terminating mobile station via the second layer and the Interface means to the further network and/or vice versa.

33. The method of claim 32, wherein the cellular telephone network comprises a gateway mobile services switching center (GMSC), a home location register being coupled to the GMSC, at least one visitor location register and at least one mobile services switching center coupled to the terminating mobile station, wherein the step for providing the routing information comprises:

the GMSC interrogating the home location register for the routing information; the home location register requesting a roaming number from the visitor location register:

the visitor location register providing the roaming number to the home location register; and the home location register providing the routing information, including the roaming number, to the GMSC in order to determine the routing to a mobile services switching center coupled to the terminating mobile station.

34. The method of claim 33, further comprising, after receiving the routing information, determining a new signalling information field or value by the GMSC, the new signalling information field or value identifying a signalling connection between the GMSC and the mobile services switching center, including the new signalling information field or value and the signalling information field that the GMSC has received from the further network into the initial address message by the GMSC, and forwarding the initial address message to the mobile services switching center by the GMSC on the basis of the received routing information.

35. The method of claim 33, wherein the cellular telephone network comprises at least one base station controller coupled to the mobile services switching center and at least one base transceiver station coupled to the base station controller and to the terminating mobile station, wherein the method further comprises:

forwarding a request for paging the mobile station from the mobile services switching center to the base station controller; and after having paged the mobile station, returning the result from the base station controller to the mobile services switching center.

36. The method of claim 35, further comprising:

creating a network unique call identification assigned to the telephone call in the mobile services switching center; and forwarding the call identification to the base station controller.

37. The method of claim 36, wherein, after receiving the call identification, the base transceiver station maps the call identification into a BSC-BTS internal connection identification, provides a BTS address Identifying the base transceiver station, and forwards the BSC-BTS internal connection identification and the BTS address to the base station controller.

38. The method of claim 37, wherein the base station controller stores the BSC-BTS internal connection identification; and forwarding the BTS address from the base station controller to the mobile services switching center.

39. The method of claim 38, wherein, after receiving the BTS address, the mobile services switching center forwards a create connection request comprising the BTS address, a bearer capability, a selected signalling information field, and the call identification to a media gateway of the interface means.

40. The method of claim 39, wherein after receiving the create connection request, the media gateway (MGW) maps the call identification into a MGW-MSC internal connection identification, provides a MGW address identifying the media gateway, and forwards a create connection complete message comprising the MGW address and the MGW-MSC internal connection identification to the mobile services switching center.

41. The method of claim 40, wherein the mobile services switching center forwards the MGW address received from the media gateway to the base transceiver station via the base station controller.

42. The method of claim 41, wherein the mobile services switching center forwards an address complete message comprising a through-connection indicator that indicates a backward through-connection to the GMSC in order to establish a backward through-connection from the media gateway to the further network.

43. The method of claim 42, wherein the mobile services switching center requests a both-way through-connection from the media gateway in order to establish the both-way through-connection between the terminating mobile station and the further network.

44. The method of claim 32, further comprising:
creating a network unique call identification assigned to the telephone call in the gateway mobile services switching center (GMSC); and
forwarding the call identification to a first media gateway.

45. The method of claim 44, wherein, after receiving the call identification, the first media gateway (MGW) maps the call identification into a GMSC-MGW internal connection identification, provides a MGW address identifying the first media gateway, and forwards the GMSC-MGW internal connection identification and the MGW address to the GMSC.

46. The method of claim 45, wherein, after receiving the MGW address of the first media gateway, the GMSC forwards a create connection request comprising the MGW address of the first media gateway, a through-connection indicator that indicates a backward through-connection, a bearer capability, a selected signalling information field and the call identification to a second media gateway of the interface means.

47. The method of claim 46, wherein, after receiving the create connection request, the second media gateway (MGW) maps the call identification into a further GMSC-MGW internal connection identification, provides a further MGW address identifying the second media gateway and forwards a create connection complete message comprising the further MGW address and the further GMSC-MGW internal connection Identification to the GMSC.

48. The method of claim 47, wherein the GMSC forwards the further MGW address received from the second media gateway to the first media gateway.

49. The method of claim 32, comprising:
forwarding the initial address message from the GSTN via a signalling gateway converting a signalling bearer and a GMSC to a mobile services switching center of the cellular telephone network; forwarding an address complete message from the mobile services switching center via the GMSC and the signalling gateway converting the signalling bearer to the further network; and
forwarding an answer message of the mobile station from the mobile services switching center via the GMSC and the signalling gateway converting the signalling bearer to the further network.

50. The method of claim 32, comprising;
forwarding the initial address message from the further network via the GMSC of the interface means and a signalling gateway converting a signalling bearer to a mobile services switching center of the cellular telephone network;
forwarding an address complete message from the mobile services switching center via the signalling gateway converting the signalling bearer and the GMSC to the further network; and
forwarding an answer message of the mobile station from the mobile services switching center via the signalling gateway converting the signalling bearer and the GMSC to the further network.

51. The method of claim 32, comprising the following steps:
forwarding the initial address message from the further network via a second signalling gateway converting the signalling bearer, the GMSC and a first signalling gateway converting the signalling bearer to a mobile services switching center of the cellular telephone network;
forwarding an address complete message from the mobile services switching center via the first signalling gateway converting the signalling bearer, the GMSC and the second signalling gateway to the further network; and
forwarding an answer message of the mobile station from the mobile services switching center via the first signalling gateway converting the signalling bearer, the GMSC and the second signaling gateway converting the signalling bearer to the further network.

* * * * *